United States Patent
Warschat et al.

(10) Patent No.: US 9,777,518 B2
(45) Date of Patent: Oct. 3, 2017

(54) COLLISION PROTECTION DEVICE FOR A PIVOTABLE HATCH OF A MOTOR VEHICLE, HATCH, MOTOR VEHICLE AND CORRESPONDING METHOD

(71) Applicants: Valeo Schalter und Sensoren GmbH, Bietigheim-Bissingen (DE); Audi AG, Ingolstadt (DE)

(72) Inventors: Ulf Warschat, Pliening (DE); Jürgen Hartmann, Gutenstetten (DE); Thomas Schuler, Wiernsheim (DE)

(73) Assignees: VALEO SCHALTER UND SENSOREN GMBH, Bietigheim-Bissingen (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/775,769

(22) PCT Filed: Mar. 11, 2014

(86) PCT No.: PCT/EP2014/054725
§ 371 (c)(1),
(2) Date: Sep. 14, 2015

(87) PCT Pub. No.: WO2014/140028
PCT Pub. Date: Sep. 18, 2014

(65) Prior Publication Data
US 2016/0024825 A1    Jan. 28, 2016

(30) Foreign Application Priority Data
Mar. 14, 2013 (DE) .................. 10 2013 102 608

(51) Int. Cl.
*E05C 17/00* (2006.01)
*B60J 5/10* (2006.01)
(Continued)

(52) U.S. Cl.
CPC ............. *E05C 17/006* (2013.01); *B60J 5/101* (2013.01); *E05F 15/43* (2015.01); *G01S 17/936* (2013.01);
(Continued)

(58) Field of Classification Search
CPC ......... B60J 5/101; E05C 17/006; E05F 15/43; E05F 2015/435; E05Y 2900/531; E05Y 2900/546; G01S 17/936
(Continued)

(56) References Cited

U.S. PATENT DOCUMENTS 6,225,768 B1 * 5/2001 Cookson ................... E06B 9/68
                                                           318/280
7,855,376 B2   12/2010 Cantin et al.
(Continued)

FOREIGN PATENT DOCUMENTS

| CN | 101356450 A | 1/2009 |
| DE | 19955249 A1 | 5/2001 |

(Continued)

OTHER PUBLICATIONS

International Search Report and Written Opinion for International Application No. PCT/EP2014/054725 dated Mar. 11, 2014 (13 pages).

*Primary Examiner* — Tyler J Lee
(74) *Attorney, Agent, or Firm* — Fitch, Even, Tabin & Flannery, LLP

(57) ABSTRACT

The invention relates to a collision protection device for a pivotable hatch of a motor vehicle, comprising at least one sensor for detecting an obstacle in the pivoting range of the hatch, and comprising a control unit, which is designed to output, in dependence on sensor signals of the at least one sensor, control commands for stopping an opening movement of the hatch, wherein the at least one sensor is an
(Continued)

optical visibility sensor, which is designed for capturing an optical visibility in an environment of the sensors.

16 Claims, 3 Drawing Sheets

(51) Int. Cl.
 *G01S 17/93* (2006.01)
 *E05F 15/43* (2015.01)
(52) U.S. Cl.
 CPC ... *E05F 2015/435* (2015.01); *E05Y 2900/531* (2013.01); *E05Y 2900/546* (2013.01)
(58) Field of Classification Search
 USPC .............................. 701/36, 49, 301
 See application file for complete search history.

(56) References Cited

U.S. PATENT DOCUMENTS

| | | | | |
|---|---|---|---|---|
| 8,442,755 B2 * | 5/2013 | Kollar | ..................... | E05F 15/43 180/167 |
| 2005/0242618 A1 | 11/2005 | Menard | | |
| 2008/0296927 A1 * | 12/2008 | Gisler | ..................... | E05F 15/43 296/146.4 |
| 2009/0000196 A1 * | 1/2009 | Kollar | ..................... | E05F 15/43 49/28 |
| 2009/0217596 A1 * | 9/2009 | Neundorf | ................ | E05B 81/20 49/506 |
| 2010/0076651 A1 | 3/2010 | Nakakura et al. | | |
| 2010/0082206 A1 * | 4/2010 | Kollar | ..................... | E05F 15/43 701/49 |
| 2011/0295469 A1 | 12/2011 | Rafii et al. | | |

FOREIGN PATENT DOCUMENTS

| | | |
|---|---|---|
| DE | 10235925 A1 | 8/2002 |
| DE | 102004062370 A1 | 6/2006 |
| DE | 102006044794 A1 | 3/2008 |
| DE | 102007014034 B3 | 9/2008 |
| DE | 102007049256 A1 | 4/2009 |
| DE | 102008029223 A1 | 12/2009 |
| DE | 102008630611 B4 | 6/2011 |
| DE | 202010017197 U1 | 10/2011 |
| EP | 968863 A1 | 1/2000 |
| WO | 2008116699 A2 | 10/2008 |

* cited by examiner

COLLISION PROTECTION DEVICE FOR A PIVOTABLE HATCH OF A MOTOR VEHICLE, HATCH, MOTOR VEHICLE AND CORRESPONDING METHOD

CROSS-REFERENCE TO RELATED APPLICATIONS

This application is a U.S. national phase application of International Application No. PCT/EP2014/054725, filed Mar. 11, 2014, designating the United States, which claims priority to German Patent Application No. 10 2013 102 608.7, filed Mar. 14, 2013, which is incorporated by reference herein in its entirety.

FIELD

The invention relates to a collision protection device for a pivotable hatch of a motor vehicle, comprising at least one sensor for detecting an obstacle in a pivoting range of the hatch, and comprising an electronic control unit, which is designed to output, in dependence on control signals from the at least one sensor, control commands for stopping an opening movement of the hatch. The invention moreover relates to a hatch for a motor vehicle, a motor vehicle comprising a hatch, as well as a corresponding method for avoiding a collision of a pivotable hatch with an obstacle.

BACKGROUND

Such collision protection devices, which serve for avoiding collisions of a pivotable hatch of a motor vehicle with obstacles, are already prior art. The interest in the present case is directed in particular to a tailgate of a passenger car, for instance a combi-van. It is already known to equip such a tailgate with sensors, which are designed to detect obstacles in the pivoting range or the opening range of the hatch during an opening movement. For instance the document DE 10 2008 029 223 A1 discloses a vehicle with a pivotable tailgate, which can be automatically opened by means of a control and drive unit. A sensor unit detects obstacles in the pivoting range of the hatch, and the opening of the tailgate can be stopped, if an obstacle is recognized prior to complete opening. The sensor unit in this connection is integrated into a light of the hatch.

A further collision protection device of the initially mentioned kind is known from the DE 10 2004 062 370 A1. Here a transmitter device and a receiver device are arranged in such a way on the tailgate that a radiating surface extends substantially in parallel and completely across the area of the tailgate. In other words the transmitter device has a transmission direction or capturing direction extending substantially in parallel to the tailgate.

In the subject matter according to document DE 102 35 925 A1 the sensor is arranged in such a way in the upper portion of the tailgate that it has a capture range directed at an angle downwards.

For detection of an obstacle in the pivoting range of the tailgate in the prior art commonly separate sensors are employed, which are used exclusively for this purpose. Such a solution, however, involves disadvantages with regard to the costs and the precious construction space. In the EP 0 968 863 A1 it is therefore suggested to employ ultrasonic sensors for detection of obstacles during the opening movement of the tailgate, which are part of the parking aid of the vehicle. These ultrasonic sensors support the driver in performing parking manoeuvres with the vehicle and moreover serve for the detection of obstacles in the pivoting range of the tailgate. What is to be regarded as disadvantageous about this prior art, however, is the fact that the ultrasonic sensors typically are not arranged on the tailgate, but on a bumper. In the case of most vehicles the ultrasonic sensors thus cannot be used for additionally capturing obstacles in the pivoting range of the tailgate.

The employment of a multifunctional sensor is further known from the DE 10 2007 049 256 A1. Here a sensor is employed, which is arranged and oriented on the tailgate in such a way that particles on the tailgate can be detected by capturing a light portion backscattered on the particles. Thus, by means of the sensor on the one hand a precipitation can be detected. On the other hand, the sensor is also used for capturing obstacles in the pivoting range of the tailgate during an opening movement and, if required, for stopping the opening movement. The capturing range of the sensor in this connection extends in parallel to the plane of the tailgate or in parallel to the plane of the pane. By this very set-up water drops on the plane of the pane can be reliably detected. Such an arrangement of the sensor, however, is only to some extent suitable for the function of the collision protection of the tailgate. With this sensor the exact capturing of the distance from the obstacle during the opening movement of the tailgate is not possible, and the opening movement can only then be stopped, when the obstacle enters the capture range of the sensor, which however has a very small height above the plane of the pane. It thus cannot always be guaranteed that the tailgate is stopped early enough before colliding with the obstacle.

It is the task of the invention to show a solution as how to facilitate in the case of a collision protection device of the initially mentioned kind an effective and reliable collision protection for the pivotable hatch of the motor vehicle without requiring much effort.

SUMMARY

According to the invention this task is solved by a collision protection device, by a hatch, by a motor vehicle, as well as by a method with the features according to the respective independent patent claims. Advantageous embodiments of the invention are subject matter of the dependent patent claims, the description, and the figures.

According to the invention a collision protection device for a pivotable hatch of a motor vehicle comprises at least one sensor for detection of an obstacle in a pivoting range of the hatch as well as an electronic control unit, which in dependence on the sensor signals of the sensor can output control commands, which effect a stopping of an opening movement of the hatch. The at least one sensor is an optical visibility sensor, which during operation of the vehicle is also used for capturing an optical visibility in the environment.

The invention is based on several insights: To start with, it is based on the insight that in the case of some collision protection devices known from the prior art separate sensors are employed, which exclusively have the function of the collision protection of the hatch. Whilst it is true that in the case of such devices invariably a safe and collision-free opening of the hatch is guaranteed, however, such devices involve disadvantages with regard to costs and construction space, because additional components need to be employed. A further insight consists in that the multifunctional devices suggested in the prior art, which additionally use already present sensors also for the function of the collision protection of the hatch, are only to a certain extent suitable for the suggested collision protection function, because either ultrasonic sensors are used that are typically not attached to the hatch, or optical sensors are used, in which an additional capturing of an obstacle in the pivoting range of the hatch is not possible due to the capturing direction of the sensor. The invention finally is based on the insight that the disadvantages of the prior art can be avoided by using a sensor for the collision protection function, which additionally is also used for capturing the optical visibility in the environment of the motor vehicle. In this connection the invention makes use of the fact that such visibility sensors commonly are mounted on the tailgate, and this as a rule behind the cover of the taillight. In an advantageous way thus such a visibility sensor can also be used for obstacles during an opening movement of the hatch, in order to stop the opening movement of the hatch, where necessary, and thus avoid a collision of the hatch with the obstacle. In order to be able to measure the current optical visibility, these sensors are in particular oriented in such a way that the capture direction extends essentially horizontal and thus perpendicular to the hatch. On the one hand, thus the distance from the obstacle can be captured in a particularly reliable way and the opening movement of the hatch be stopped effectively, if required; on the other hand, a sensor already known for other purposes is used so that the employment of a separate sensor with the involved disadvantages is no longer necessary.

The term "visibility" in the present case is understood to relate in particular to a meteorological visibility, i.e. the largest horizontal distance, at which an object can still just about be recognized by a person. This visibility can in particular be influenced by atmospheric effects or atmospheric components, such as for instance fog, snowfall, and the like. On the other hand, the visibility can also be influenced by an air pollution, which causes an additional light attenuation in the visible spectral range.

The visibility sensor measures the visibility in an optical manner. This means that the sensor can emit optical signals, in particular infrared signals, and receive transmission signals reflected in the environment again as receiving signals. The visibility then is preferably determined in dependence on a reflectivity and/or in dependence on the transmission time of the emitted signals.

Preferably the control unit is configured for automatic control of the opening movement whilst emitting corresponding control signals to an actor. This means that the control unit can automatically control the opening movement of the hatch so that the hatch is not to be opened manually by the user, but rather automatically by means of the electronic control unit and the actor. In this connection the actor drives the hatch, whilst the control unit drives the actor. The actor can for example be an electrical drive motor. The controlling of the opening movement can for instance be effected in such a way that the control unit then automatically opens the hatch when the user actuates a corresponding actuation element and/or an authenticated person is detected in the area of the hatch, for instance with the aid of a camera or the like. The user thus need not open the hatch manually and thus by hand, but the opening movement is automatically performed by means of the actor.

Preferably, the sensor captures a distance from the obstacle. The control unit can then output the control commands for stopping the opening movement when the distance remains below a predetermined threshold value. Such a way of proceeding allows for a stopping in time and thus for a safe opening of the hatch without causing collision. If the threshold value is exceeded again, the opening movement of the hatch can be continued and the hatch be opened completely and without causing collision.

It moreover proves advantageous if the control unit in dependence on the sensor signals of the sensor outputs an acoustic and/or optical warning signal by means of a corresponding output device. Thus an unnecessary extended halting of the hatch can be avoided, if for instance a person is present in the pivoting range of the hatch and prevents the opening movement of the hatch. This person by the warning signal is now notified of the fact that he or she is standing in the area of the hatch and an opening of the hatch without causing a collision thus is not possible. On the other hand, if required, the driver by the output of the warning signal can be effectively notified of the fact that stationary obstacles are present in the opening area of the hatch and the vehicle for instance should be re-parked.

In this connection it may also be envisaged that in the control unit a first threshold value and a higher second threshold value are stored for the distance. If the higher second threshold value is not reached, the optical and/or acoustic warning signal can be output. If additionally the first threshold value is not reached, the opening movement of the hatch can be stopped in order to avoid the collision. In this way, if required, an unnecessary stopping of the hatch can be avoided, because a certain period of time will elapse between the point in time when the warning signal is output and the point in time when the hatch stops, during which the pivoting range of the hatch can be released.

If the opening movement of the hatch is stopped, the user is preferably provided at any time with the option of resuming the opening movement. The control unit in this regard can receive an input effected by the user at an operating device—for instance a remote control unit or a vehicle key—and upon receipt of this input the control unit can immediately resume the previously stopped opening movement of the hatch due to the input of the user, and this in particular independently of the current sensor signals. A stopping of the opening movement of the hatch against the will of the user is thus prevented.

As already set out, the sensor can be an infrared sensor. Preferably the sensor has an infrared transmitter and at least one infrared receiver. The infrared transmitter serves for emitting infrared signals into the environment of the motor vehicle; the infrared receiver in turn serves for receiving transmitted signals reflected in the environment. The infrared transmitter and the infrared receiver can be arranged in a common sensor housing so that the sensor on the whole forms a very compact unit. Preferably the infrared transmitter is operated in a pulsed fashion and thus emits a sequence of infrared pulses. The infrared receiver in turn can be configured as photo diode. The sensor can also include an internal calculator unit, which is configured for evaluating the received infrared signals and for determining the optical visibility independently of the received infrared signals.

The invention moreover relates to a hatch for a motor vehicle, which has a collision protection device according to the invention.

Preferably, on the hatch at least part of a light, in particular a taillight, of the motor vehicle is arranged. Then the sensor can be incorporated into the hatch-side part of the light and in this connection be arranged behind a cover of the light. Such an integration of the sensor into the light on the one hand provides a reliable protection of the sensor against external environmental influences and on the other hand also provides an optically attractive appearance of the hatch because the sensor is arranged to be concealed behind the cover. Moreover, thus a capturing of the obstacle in the direction perpendicular to the hatch plane or the cover is guaranteed so that obstacles in the pivoting range of the hatch can be reliably detected without the function of the visibility measuring being impaired.

Preferably the hatch is a tailgate of the motor vehicle. It is namely commonly is the tailgate, which can be opened automatically and thus is exposed to an increased danger of colliding with a ceiling or other obstacles.

The sensor preferably has a capture direction, which extends at an angle of 80° to 100° relative to a surface of the hatch, in particular to the cover of the light. In particular it can also be envisaged that the capture direction of the sensor extends perpendicular to the hatch plane and/or the cover of the light. Thus, the distance from obstacles can be captured particularly precisely and the opening movement be stopped in time, if required.

A motor vehicle according to the invention, in particular a passenger car, comprises a hatch according to the invention.

A method according to the invention serves for avoiding a collision of a pivotable hatch of a motor vehicle with an obstacle during an opening movement of the hatch, wherein by means of at least one sensor the obstacle is detected in a pivoting range of the hatch and in dependence on sensor signals of the sensor control commands for stopping the opening movement of the hatch by means of a control unit are output, and wherein the sensor signals are provided by means of an optical visibility sensor that is used whilst the vehicle is driving for capturing an optical visibility in an environment of the motor vehicle.

The preferred embodiments presented with reference to the collision protection device according to the invention and their advantages in analogy apply to the hatch according to the invention, to the motor vehicle according to the invention, as well as to the method according to the invention.

Further features of the invention derive from the claims, the figures, and the description of the figures. All aforementioned features and feature combinations mentioned in the description as well as the features and feature combinations named in the description of the figures and/or in the figures alone can be used not only in the respective indicated combination, but also in other combinations or taken alone.

BRIEF DESCRIPTION OF THE DRAWINGS

The invention is now explained in more detail by reference to a preferred embodiment as well as the enclosed drawings.

These show in.

DESCRIPTION OF THE PREFERRED EMBODIMENTS

Figure 1:
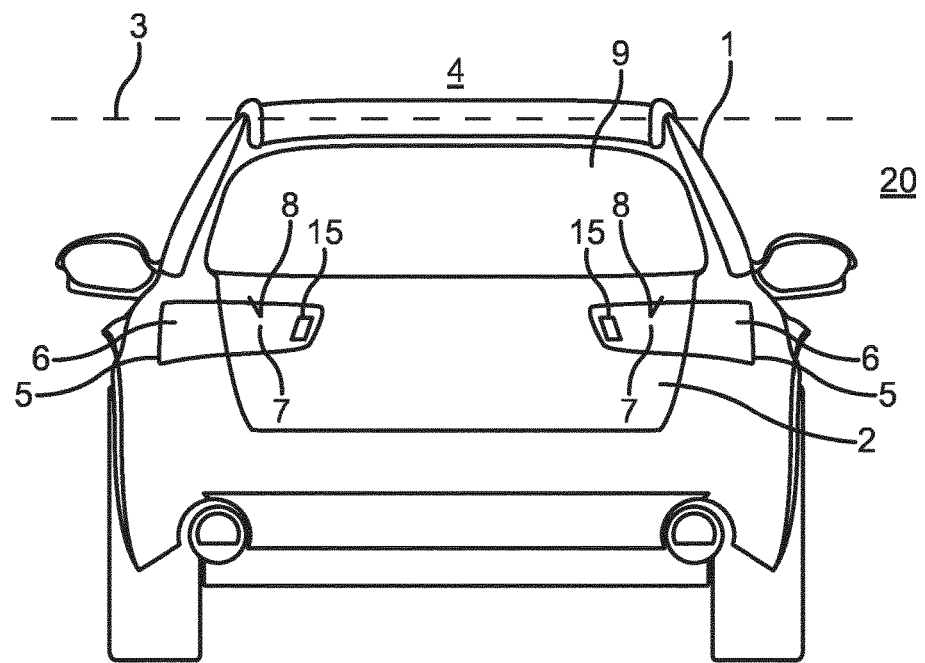
FIG. 1 in a schematic view a rear view of a motor vehicle according to an embodiment of the invention.

A motor vehicle 1 shown in FIG. 1 is for instance a combi-van or, in short, combi. The motor vehicle 1 in known fashion has a hatch 2, which is supported to be pivotable about a horizontally extending pivot axis 3 on the body components of the motor vehicle 1. The tailgate 2 has a pivoting range 4 defined in such a way that during an opening movement of the tailgate 2 a collision with an obstacle can only occur, if the obstacle is situated in the pivoting range 4. The pivoting range 4 thus is predetermined to be fixed with regard to the motor vehicle 1.

In known fashion the motor vehicle 1 has a left and a right taillight 5. The taillights 5 are each subdivided into two parts, namely a part 6, which is stationary or mounted fixed in the body, as well as a hatch-side part 7, which is arranged on the tailgate 2. The stationary part 7, by contrast, is arranged outside the tailgate 2 on the motor vehicle 1.

Each taillight 5 in known fashion also has a cover 8, which for instance is formed from a transparent or translucent material, for instance from plastics, and covers or protects the light sources. The respective light sources therein are arranged concealed behind the cover 8.

In the tailgate 2 moreover in known fashion a rear pane 9 can be integrated.

Figure 3:
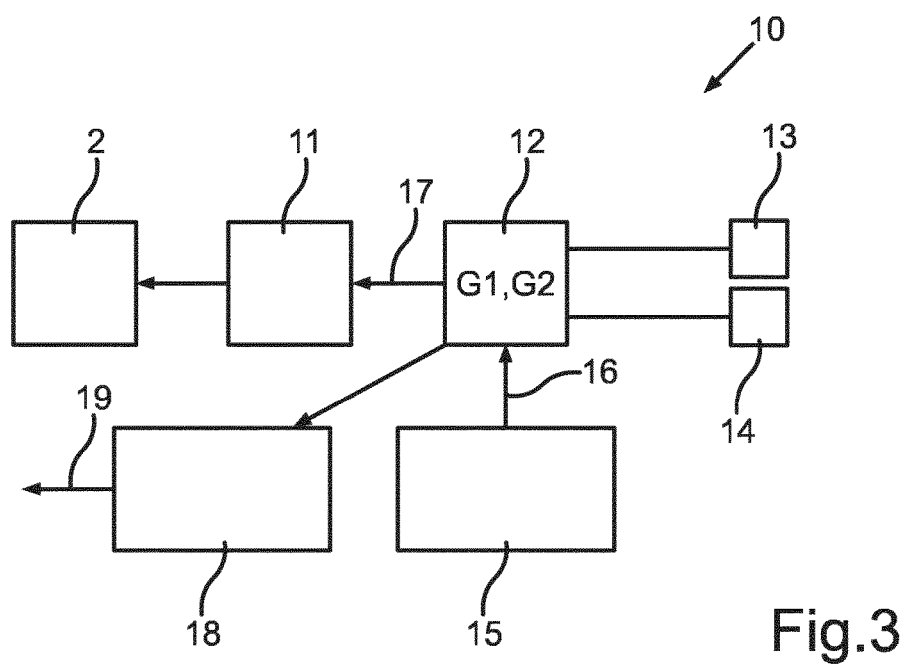
FIG. 3 a block diagram of a collision protection device according to an embodiment of the invention.

The tailgate 2 can be opened automatically with the aid of an actor or a drive motor. Making reference now to FIG. 3, in which a block diagram of a collision protection device 10 is shown, the tailgate 2 is driven by means of an actor 11. The actor 11 is in particular an electric motor. The actor 11 is driven by means of an electronic control device 12, which can for instance be configured as a micro controller. The control device 12 receives signals from an operating device 13 and in response to an actuation of the operating device 13 through a user can cause an automatic opening of the tailgate 2 by means of the actor 11. Additionally or alternatively the control device 12 can also receive signals from a capture device 14, for instance a camera, which is configured for detection of an authorized person in the area of the tailgate 2. If the approaching of a person to the tailgate 2 is detected, the tailgate 2 can be opened automatically.

Moreover, the collision protection device 10 includes a sensor 15, by means of which obstacles can be detected, which are present in the pivoting range 4 of the tailgate 2. If such an obstacle is detected during the opening movement of the tailgate 2, this opening movement is stopped in order to prevent a collision. Preferably, in this connection a distance 16 between the sensor 15 and the obstacle is measured and conveyed to the control device 12. If the control device 12 recognizes that the distance 16 remains below a predetermined threshold value, control commands 17 causing an immediate stopping of the tailgate 2 are output to the actor 11. The actor 11 here adopts the braking function.

Optionally the control device 12 can also drive an electronic output device 18, which can comprise a loudspeaker and/or at least one light source. Upon detection of the obstacle the control device 12 can control the output device 18 for outputting an optical and/or acoustic warning signal 19 in order to inform the persons present in the area of the tailgate 2 correspondingly about the recognized obstacle.

In the control device 12 optionally also two different threshold values G1, G2 for the measured distance 16 can be stored, wherein then one has: G2>G1. If for instance to start with the second threshold value G2 is not reached, the output device 18 for outputting the warning signal 19 is driven. If then additionally also the first threshold value G1 is not reached, the output of the control commands 17 for stopping the opening movement of the tailgate 2 is effected.

A particular interest is now focussed on the design of the sensor 15, which is configured as optical visibility sensor serving for measuring the optical or meteorological visibility (in the spectral range visible to humans) in the environment 20 of the motor vehicle 1. With repeated reference to FIG. 1 such a sensor 15 is integrated into at least one of the taillights 5, namely into the part 7 on the hatch side of the taillight 5. Also respective sensors 15 can be integrated into both the left as well as into the right taillight 5. In this connection the sensor 15 is arranged to be concealed behind the respective cover 8.

As set out, the sensor 15 serves for measuring the meteorological visibility in the environment 20 of the motor vehicle 1. Making reference now to FIG. 2 the sensor 15 is an optical sensor with an infrared transmitter 50 and an infrared receiver 21, which are arranged in a housing 22 fixed thereto. The infrared transmitter 50 is an infrared diode, whilst the infrared receiver 21 is configured as photo diode. Doing without movable mirror elements or the like, in front of the infrared transmitter 50 there is a transmission lens 23, which serves for bundling infrared beams 24. Also in front of the infrared receiver 21 is arranged a receiver lens 25, through which infrared beams 26 reflected in the environment 20 spread out and are focussed upon the infrared receiver 21.

The sensor 15 also contains an internal calculation unit 27, which on the one hand is configured for driving the infrared transmitter 50 and on the other hand for evaluating a receiving signal 51 provided by the infrared receiver 21. The electrical receiving signal 51 in this connection characterizes the infrared beams 26 received by the receiver 21. The calculation unit 27 contains several function blocks: A first function block 28 emits control signals 29 to the transmitter 50 and thus serves for driving the transmitter 50. The transmitter 50 in this connection is operated in a pulsed fashion so that it emits a sequence of infrared pulses. By means of a further function block 30 in dependence on the electrical receiving signal 51 as well as in consideration of the control signals 29 a reflectivity, i.e. a ratio of the energy of the received infrared beams 26 and the emitted infrared beams 24, is determined as well as the transmission time of the infrared beams 24, 26. In dependence on these measured variables then in a further function block 31 the visibility is determined, which is indicated for instance in meters. The information about the visibility then is output according to the shown arrow 32 and for instance transmitted to a control device of the motor vehicle 1. This control device can for instance automatically drive the headlights and/or the taillights 5 of the motor vehicle 1 in dependence on the measured visibility and in this connection for instance switch to fog light. At the same time the calculation unit 27 also transmits information about the measured distance 16 to the control unit 12.

Figure 2:
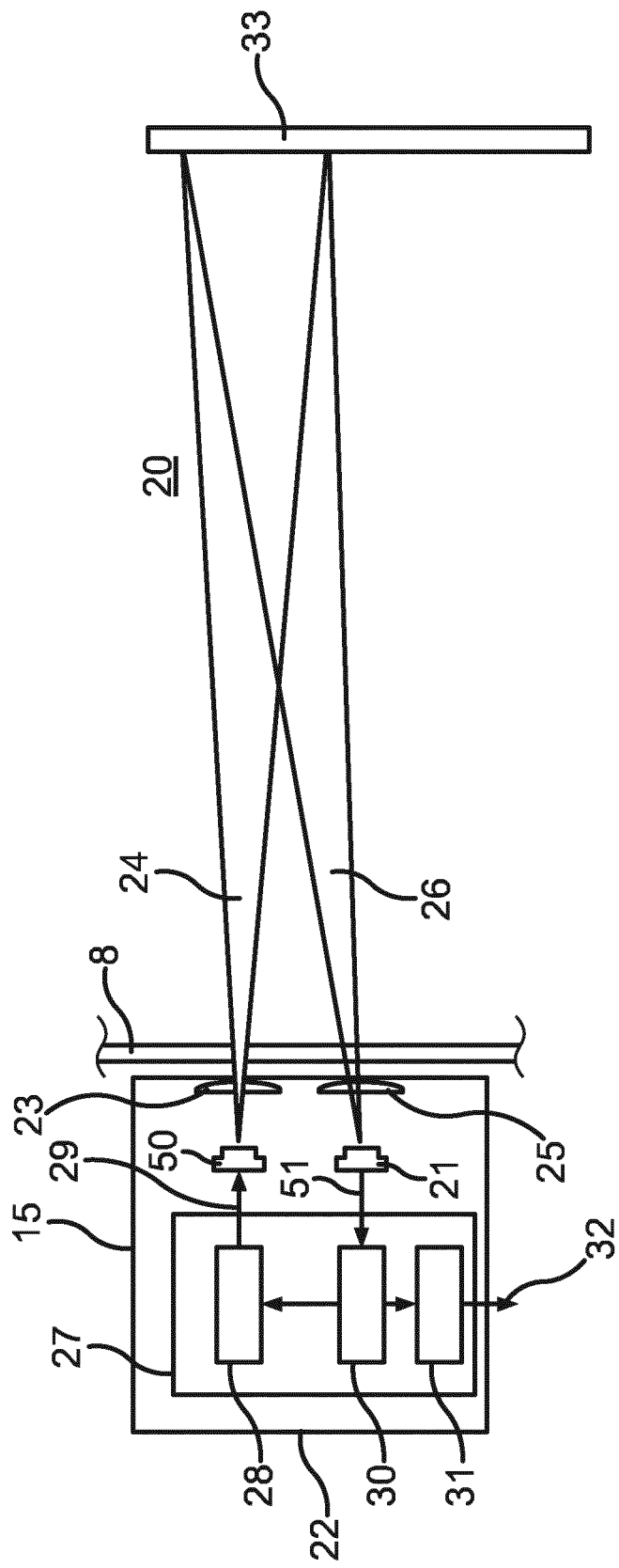
FIG. 2 in a schematic view a visibility sensor.

If now the tailgate 2 of the motor vehicle 1 is automatically opened by means of the control unit 12, the sensor 15 measures the distance 16 from an obstacle 33 suggested in FIG. 2. The control unit 12 then compares the measured distance 16 with the stored threshold values G1, G2 and then, if required, drives the output device 18 or outputs the control commands 17 to the actor 11.

The invention claimed is:

1. A dual operation optical visibility and collision protection device for use in conjunction with a pivotable hatch of a motor vehicle, the device comprising:
   a sensor for detecting optical visibility and for detecting an obstacle in a pivoting range of the hatch, the sensor having an infrared transmitter and an infrared receiver;
   a first control unit configured to output, in dependence on first sensor signals from the sensor, control commands for stopping an opening movement of the hatch;
   a second control unit configured to output, in dependence on second sensor signals from the sensor, control commands for activating at least one of a headlight, taillight, or fog light of the motor vehicle;
   wherein the sensor is configured to measure at least one of the reflectivity and transmission time of emitted and reflected infrared beams, determine a distance based on the reflected infrared beams, and transmit first sensor signals to the first control unit and second sensor signals to the second control unit based on the distance.

2. The dual operation optical visibility and collision protection device according to claim 1, wherein the first control unit is configured for automatic driving of the opening movement while emitting control signals to an actor.

3. The dual operation optical visibility and collision protection device according to claim 1, wherein the sensor is configured for capturing a distance from the obstacle and the first control unit is designed to output control commands for stopping the opening movement, when the distance remains below a predetermined threshold value (G1).

4. The dual operation optical visibility and collision protection device according to claim 3,
   wherein in the first control unit a first threshold value (G1) and a higher second threshold value (G2) for the distance are stored,
   wherein the first control unit is configured for
      outputting the warning signal, in case the distance remains below the second threshold value (G2), and
      outputting the control commands for stopping the opening movement, in case the distance remains below the first threshold value (G1).

5. The dual operation optical visibility and collision protection device according to claim 1, wherein the first control unit is designed to output, in dependence on the first sensor signals of the sensor, at least one of an acoustic warning signal and an optical warning signal by operation of an output device.

6. The dual operation optical visibility and collision protection device according to claim 1, wherein the first control unit is configured for receiving an input made by an operator to an operating device and upon receiving the input resuming the previously stopped opening movement of the hatch.

7. The dual operation optical visibility and collision protection device according to claim 6, wherein the first control unit is configured for receiving the input made by the operator to the operating device and upon receiving the input resuming the previously stopped opening movement of the hatch independently of the first sensor signals.

8. A hatch for a motor vehicle, comprising a dual operation optical visibility and collision protection device, the device comprising:
   a sensor for detecting optical visibility and for detecting an obstacle in a pivoting range of the hatch, the sensor having an infrared transmitter and an infrared receiver;
   a first control unit configured to output, in dependence on first sensor signals from the sensor, control commands for stopping an opening movement of the hatch;
   a second control unit configured to output, in dependence on second sensor signals from the sensor, control commands for activating at least one of a headlight, taillight, or fog light of the motor vehicle;
   wherein the sensor is configured to measure at least one of the reflectivity and transmission time of emitted and reflected infrared beams, determine a distance based on the reflected infrared beams, and transmit first sensor signals to the first control unit and second sensor signals to the second control unit based on the visibility distance.

9. The hatch according to claim 8, wherein on the hatch at least one part of a light of the motor vehicle is arranged and the sensor is integrated into the hatch-side part of the light and this connection is arranged behind a cover of the light.

10. The hatch according to claim 9, wherein the light is a taillight.

11. The hatch according to claim 8, wherein the hatch is a tailgate of the motor vehicle.

12. The hatch according to claim 8, wherein the sensor has a capture direction, which extends at an angle of 80° to 100° relative to a surface of the hatch.

13. The hatch according to claim 12, wherein the capture direction extends at an angle of 80° to 100° relative to a cover of a light.

14. A motor vehicle comprising a hatch with a dual operation optical visibility and collision protection device, the device comprising:
- a sensor for detecting optical visibility and for detecting an obstacle in a pivoting range of the hatch, the sensor having an infrared transmitter and an infrared receiver;
- a first control unit configured to output, in dependence on first sensor signals the sensor, control commands for stopping an opening movement of the hatch
- a second control unit configured to output, in dependence on second sensor signals from the sensor, control commands for activating at least one of a headlight, taillight, or fog light of the motor vehicle;

wherein the sensor is configured to measure at least one of the reflectivity and transmission time of emitted and reflected infrared beams, determine a distance based on the reflected infrared beams, and transmit first sensor signals to the first control unit and second sensor signals to the second control unit based on the distance.

15. The motor vehicle according to claim 14, wherein the motor vehicle is a passenger car.

16. A method for detecting optical visibility and for avoiding a collision of a pivotable hatch of a motor vehicle with an obstacle during an opening movement of the hatch, the method comprising:
- providing a sensor having an infrared transmitter and an infrared receiver;
- by operation of the sensor, measuring at least one of the reflectivity and transmission time of emitted and reflected infrared beams, determining a distance based on the reflected infrared beams, and transmitting first sensor signals to a first control unit and second sensor signals to a second control unit based on the distance;
- outputting, in dependence on the first sensor signals from the sensor, control commands for stopping an opening movement of the hatch; and
- outputting, in dependence on the second sensor signals from the sensor, control commands for activating at least one of a headlight, taillight, or fog light of the motor vehicle.

* * * * *